United States Patent
Feitisch et al.

(10) Patent No.: US 10,072,980 B2
(45) Date of Patent: Sep. 11, 2018

(54) SPECTROMETER WITH VARIABLE BEAM POWER AND SHAPE

(71) Applicant: SpectraSensors, Inc., Rancho Cucamonga, CA (US)

(72) Inventors: Alfred Feitisch, Los Gatos, CA (US); Xiang Liu, Rancho Cucamonga, CA (US); Chih-Husan Chang, Rancho Cucamonga, CA (US); Hsu-Hung Huang, Rancho Cucamonga, CA (US)

(73) Assignee: SpectraSensors, Inc., Rancho Cucamonga, CA (US)

( * ) Notice: Subject to any disclaimer, the term of this patent is extended or adjusted under 35 U.S.C. 154(b) by 0 days.

(21) Appl. No.: 15/376,541

(22) Filed: Dec. 12, 2016

(65) Prior Publication Data

US 2017/0248466 A1    Aug. 31, 2017

Related U.S. Application Data

(63) Continuation of application No. 14/466,839, filed on Aug. 22, 2014, now Pat. No. 9,518,866.

(51) Int. Cl.
*G01J 3/46* (2006.01)
*G01J 3/02* (2006.01)
*G01J 3/42* (2006.01)

(52) U.S. Cl.
CPC ............ *G01J 3/0291* (2013.01); *G01J 3/027* (2013.01); *G01J 3/42* (2013.01)

(58) Field of Classification Search
CPC ...... G01J 3/02; G01J 3/027; G01J 3/50; G01J 3/51; G01J 3/46; G01J 3/524
See application file for complete search history.

(56) References Cited

U.S. PATENT DOCUMENTS 5,929,981 A * 7/1999 Keilbach ............... G01N 21/15
                                                              356/301
6,064,488 A    5/2000 Brand et al.
(Continued)

FOREIGN PATENT DOCUMENTS

DE      19840345 A1    3/2000
EP       0203767 A2   12/1986
WO   WO-2004/113887 A2  12/2004

OTHER PUBLICATIONS

Herriott, D., Kogelnik, H., and Kompfner, R. "Off-Axis Paths in Spherical Mirror Interferometers." *Applied Optics*, vol. 3, No. 4, 1964, pp. 523-526.

(Continued)

*Primary Examiner* — Abdullahi Nur
(74) *Attorney, Agent, or Firm* — Mintz Levin Cohn Ferris Glovsky and Popeo, P.C.

(57) ABSTRACT

At least one light source is configured to emit at least one beam into a sample volume of an absorbing medium. In addition, at least one detector is positioned to detect at least a portion of the beam emitted by the at least one light source. Further, at least one beam modification element is positioned between the at least one detector and the at least one light source to selectively change at least one of (i) a power intensity of, or (ii) a shape of the beam emitted by the at least one light source as detected by the at least one detector. A control circuit is coupled to the beam modification element. Related apparatus methods, articles of manufacture, systems, and the like are described.

20 Claims, 5 Drawing Sheets

(56) References Cited

U.S. PATENT DOCUMENTS

| | | |
|---|---|---|
| 7,679,059 B2 | 3/2010 | Zhou |
| 9,518,866 B2 | 12/2016 | Feitisch et al. |
| 9,816,860 B2 | 11/2017 | Feitisch et al. |
| 2003/0094433 A1 | 5/2003 | Ouellet et al. |
| 2003/0190113 A1 | 10/2003 | Huang et al. |
| 2005/0128403 A1 | 6/2005 | Liu |
| 2005/0129840 A1 | 6/2005 | Lee et al. |
| 2005/0213092 A1* | 9/2005 | MacKinnon .............. G01J 1/32 356/336 |
| 2005/0229698 A1 | 10/2005 | Beecroft et al. |
| 2007/0246653 A1 | 10/2007 | Zhou |
| 2008/0239306 A1 | 10/2008 | Sutherland et al. |
| 2011/0066092 A1 | 3/2011 | Moeskops et al. |
| 2011/0140870 A1 | 6/2011 | Ullrich |
| 2011/0164251 A1 | 7/2011 | Richter |
| 2011/0239421 A1 | 10/2011 | Tertitski et al. |
| 2011/0299076 A1 | 12/2011 | Feitisch et al. |
| 2013/0077097 A1 | 3/2013 | Engstrand |
| 2014/0160474 A1 | 6/2014 | Keller et al. |
| 2014/0168649 A1 | 6/2014 | Smith |
| 2016/0066775 A1 | 3/2016 | Hunter et al. |
| 2016/0327479 A1 | 11/2016 | Feitisch et al. |

OTHER PUBLICATIONS

Herriott, Donald R. and Schulte, Harry J. "Folded Optical Delay Lines." *Applied Optics*, vol. 5, No. 8, 1965, pp. 883-889.

\* cited by examiner

SPECTROMETER WITH VARIABLE BEAM POWER AND SHAPE

CROSS-REFERENCE TO RELATED APPLICATION

This application is a continuation under 35 U.S.C. § 120 of U.S. patent application Ser. No. 14/466,839 filed on Aug. 22, 2014, the disclosure of which is incorporated herein by reference in its entirety.

TECHNICAL FIELD

The subject matter described herein relates to spectroscopic analyzers in which power and/or a shape of beam emitted by a light source is selectively variable.

BACKGROUND

Spectrometers use light sources for the detection and quantification of emission or absorption of radiation by matter (e.g. individual molecules in analysis of gas or liquid phase compounds). The radiation from such light sources is absorbed or emitted with a particular energy determined by transitions occurring to the molecules of an analyte. For example, in infrared spectroscopy, discrete energy quanta are absorbed by molecules due to excitation of vibrational or rotational transitions of the intra-molecular bonds.

Variations in environmental conditions as well as aging can cause transmitted and/or detected power and/or beam shape of a light source within a spectrometer to change over time. A change in transmitted and/or detected power and beam shape in a spectrometer can alter the spectrometer calibration and cause spectrometer reading offsets. Such reading offsets can cause higher operating costs for a controlled process, costly replacement of equipment, including but not limited to catalytic converters, or harmful conditions to humans or the environment if harmful concentration limits of a measured analyte are being exceeded. In some cases, spectrometers suffering such issues require manual calibration or even replacement by a technician. Such service calls are costly and result in downtime for the spectrometer while such repairs are being performed.

SUMMARY

In one aspect, at least one light source is configured to emit a beam into a sample volume of an absorbing medium. In addition, at least one detector is positioned to detect at least a portion of the beam emitted by the light source. Further, a beam modification element is positioned between the detector and the light source to selectively change at least one of (i) a power intensity of, or (ii) a shape of the beam emitted by the light source as detected by the at least one detector. A control circuit is coupled to the beam modification element.

The absorbing medium comprises gas and/or liquid.

In some cases, a housing is also provided that defines the sample volume. In other variations, the sample volume forms part of an open path system.

The beam modification element can take many forms. For example, the beam modification element can include an optical filter or an optical diffuser. The beam modification element can include an optical lens. The beam modification element can include a transmissive diffuser or a reflective diffuser. The beam modification element can include a reflector with a selectively adjustable surface. The beam modification element can include an adjustable aperture. The beam modification element can include a liquid crystal element. The beam modification element can include a tunable filter. The tunable filter can, in some cases, include a thermal optical tuner and/or a quantum well tuning element.

The beam modification element can include a neutral density (ND) filter. The beam modification element comprises a rotatable optical interference filter. The beam modification element comprises a filter wheel having two or more different optical filters that are selectively movable within the beam path. The beam modification element can include a filter wedge. The beam modification element can include, for example, one or more of saturable absorbers, spatial filters, waveguides, films made from at least one layer of dielectric material, films made from organic material which can be rotated or translated with respect to the axis of beam propagation, Bragg gratings, light valves, polarizers, light power actuators, transmissive optical elements with diffractive optical structures which alter the beam profile, transmissive optical elements with rough polishing, reflective optical elements with surface structure which causes scattering of an incident laser beam or alters the beam profile, diffractive optical elements, Fresnel type optical elements, films or optical elements made from hydrocarbon materials, or beam splitting devices.

In some variations, there can be at least one actuation element coupled to the beam modification element that is configured to selectively move a position and/or angle of the beam modification element along at least one axis. The at least one actuation element can include one or more of: piezo actuators, stepper motors, electro-optical actuators, acousto-optical actuators, a micro-electro-mechanical systems (MEMS) actuation devices, an inch-worm, a mechanical actuator, a magnetic actuator, an electrostatic actuator, an inductive actuator, a rotary actuator, a heated actuator, a pressure actuator, a stress and strain actuator, a stepper motor or an analog motor. The actuation element can be coupled to the light source or detector to move the position and/or angle of the light source or detector. For example, the detector can be moved farther away from the focal point to get a larger beam diameter on the detector surface. In another example, when the detector surface is perpendicular to the incident beam, if tilting the detector by 30 degree, the incident beam diameter on the detector will double. Furthermore, the beam modification element can be situated in the beam path between the at least one light source and the at least one detector and an actuation element can be coupled to the beam modification element to move the angle and/or position of the beam in the sample volume and on the detector. Additionally, if the beam modification element is a lens or mirror, its radius of curvature (ROC) can be changed to modify the beam shape. If the beam modification element is a lens, the distance of lens surfaces, or the refractive index of the lens medium can be changed to modify the beam shape.

The at least one light source can be coupled to the control circuit.

The at least one detector can be coupled to the control circuit and include an array of photoreceivers. The array of photoreceivers can include/be a quad cell detector.

The control circuit can selectively cause the beam modification element to change a shape and/or power intensity of the beam detected by the at least one detector in response to a position and/or angle and/or power density level that such beam is detected by at least one photodetector.

The at least one light source can take various forms including, but not limited to, at least one of a tunable diode laser, a tunable semiconductor laser, a quantum cascade laser, an intra-band cascade laser (ICL) a vertical cavity surface emitting laser (VCSEL), a horizontal cavity surface emitting laser (HCSEL), a distributed feedback laser, a light emitting diode (LED), a super-luminescent diode, an amplified spontaneous emission (ASE) source, a gas discharge laser, a liquid laser, a solid state laser, a fiber laser, a color center laser, an incandescent lamp, a discharge lamp, a thermal emitter, or a device capable of generating frequency tunable light through nonlinear optical interactions.

The detector(s) can take various forms including one or more of an indium gallium arsenide (InGaAs) detector, an indium arsenide (InAs) detector, an indium phosphide (InP) detector, a silicon (Si) detector, a silicon germanium (SiGe) detector, a germanium (Ge) detector, a mercury cadmium telluride detector (HgCdTe or MCT), a lead sulfide (PbS) detector, a lead selenide (Pb Se) detector, a thermopile detector, a multi-element array detector, a single element detector, or a photo-multiplier.

The housing can define a sample cell that comprises at least one of a multiple-pass configuration in which the light is reflected between one or more optically reflective mirrors while the light remains inside the sample cell, a multiple-pass configuration in which the light is refracted by one or more optical elements while the light remains inside the sample cell, a Herriot Cell, an off-axis optical resonator, a parabolic light collector, a spherical light collector, a White cell, an optical cavity, a hollow core light guide, or a single pass configuration in which the light is not being reflected while the light remains inside the sample cell In another aspect, at least one light source forming part of a spectrometer emits at least one beam into a sample volume comprising an absorbing medium. Thereafter, at least one detector detects at least a portion of the beam emitted by the light source. It is then determined, based on the detected at least a portion of the beam and by a controller, that at least one of (i) a power intensity, or (ii) a shape of the beam should be changed. Next, at least one beam modification element under control of the controller, causes at least one of the (i) power intensity or (ii) shape of the beam emitted by the light source as detected by the at least one detector to selectively change.

In a further aspect, at least one light source forming part of a spectrometer is caused to emit at least one beam into a sample volume comprising an absorbing medium. Next, a signal is received from at least one detector that characterizes detection of at least a portion of the beam emitted by the light source. It is then determined, based on the received signal, that at least one of (i) a power intensity, or (ii) as shape of the beam should be changed. Thereafter, at least one beam modification element is caused to change at least one of (i) the power intensity or (ii) the shape of the beam emitted by the at least one light source as detected by the at least one detector.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, spectrometer sensitivity to accuracy offsets due to age and environmental factors can be greatly reduced by selectively changing transmitted and/or detected power and/or a shape of beam(s) emitted by a light source to ensure optimal spectrometer performance and calibration fidelity. In particular, the current subject matter can address spatial sensitivity variations across the active surface of the detectors, the limited dynamic range of the detectors to linearly respond to power/intensity of an incident beam, and varying response to DC and AC light power. Further, the current subject matter is advantageous in that it can be used to address a light beam being received at different locations across the detector surface or being received with different spot sizes which causes a different electronic loop gain and resulting calibration offsets.

Further advantages of the current subject matter include being able to address AC and DC gain changing as a function of incident DC power/DC intensity of the beam spot on the detector surface. In one example, a very high intensity DC beam spot on the detector surface can, casually speaking, bleach the detector area to some extent, altering the AC gain for a very low power 2f signal. The amount of "bleaching" of carriers has to do with the carrier mobility, the detector bias voltage and the proximity of the beam spot to the electrodes mounted on the back of a typical detector, including but not limited to a semiconductor detector. The smaller the spot, the higher the intensity, the more rapidly, the AC and DC gain will vary spatially.

Still further, the current subject matter can address differences in gain for the AC component (including but not limited to a harmonic 2f signal resulting from a frequency modulation of the light source) and the DC component (total incident light power) of the light beam whether due to detector temperature changes or otherwise. As the concentration reading of a 2f TDL spectrometer is being derived from ratioing the 2f signal with the DC signal, a changing AC to DC gain relationship on the detector, with respect to conditions at time of calibration, will alter the concentration reading and cause calibration offsets (as a function of incident power and power distribution on the detector surface).

The details of one or more variations of the subject matter described herein are set forth in the accompanying drawings and the description below. Other features and advantages of the subject matter described herein will be apparent from the description and drawings, and from the claims. It should be noted that the current subject matter contemplates both a closed sample cell and an open path system for detecting trace gases and/or liquids. The terms "sample gas volume", "gas volume", "sample liquid volume" and "liquid volume" as used herein therefore refers to either a flowing volume or a static, batch volume of gas or liquid (as the case may be).

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address the aforementioned and other potential issues due to beam sensitivity with spectroscopic measurements, implementations of the current subject matter can provide a spectrometer having a light source and an optical assembly with the ability to change power and/or shape of a detected beam or a portion thereof. Gas and/or liquid sampled from a source can include absorbing media (e.g., one or more analyte compounds, etc.). Detection and/or quantification of the concentration of such absorbing media can be performed by spectroscopic analysis. The spectrometer can include the at least one beam modification element that causes the power and/or shape of a transmitted and/or detected beam emitted by the light source to change as specified by a controller. In some variations, the system can include spatial detectors/detector arrays so that the control unit can determine a position and/or shape and/or power of the beam and cause the beam modification element to make any required changes.

Analyte compounds with which implementations of the current subject matter can be used include, all gas, liquid and solid phase atoms, molecules and ions, which absorb light, but are not limited to, hydrogen sulfide (H2S); hydrogen chloride (HCl); water vapor (H2O); hydrogen fluoride (HF); hydrogen cyanide (HCN); hydrogen bromide (HBr); ammonia (NH3); arsine (AsH3); phosphine (PH3); oxygen (O2); carbon monoxide (CO); carbon dioxide (CO2); chlorine (Cl2); nitrogen (N2), hydrogen (H2); hydrocarbons, including but not limited to methane (CH4), ethane (C2H6), ethylene (C2H4), acetylene(C2H2), etc.; fluorocarbons; chlorocarbons; alcohols; ketons; aldehydes; acids, bases and the like.

Figure 1:
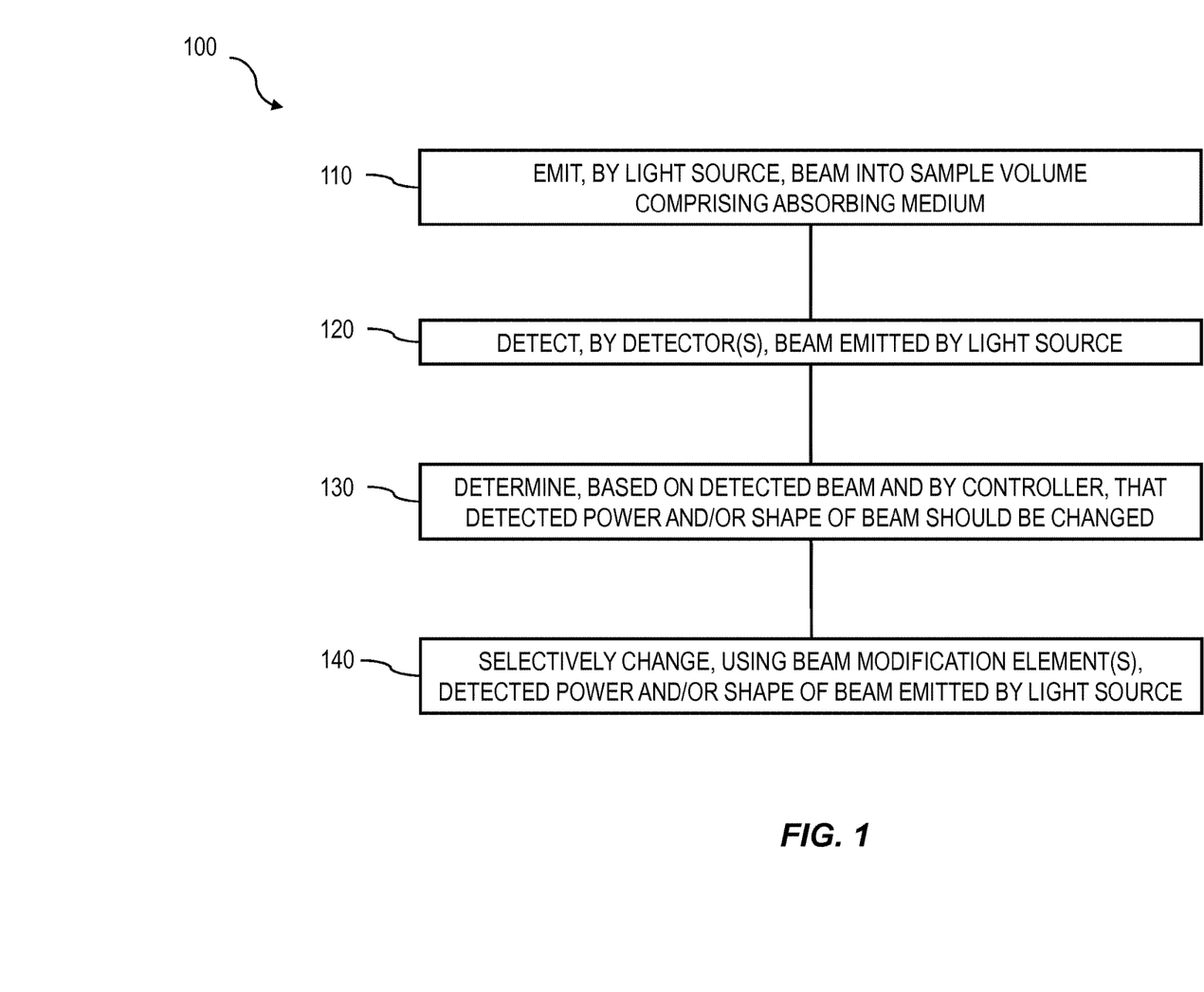
FIG. 1 is a process flow diagram illustrating selective changing detected power and/or shape of a beam within a spectrometer.

FIG. 1 is a process flow diagram 100 in which, at 110, at least one light source emits a beam into a sample volume comprising an absorbing medium. Thereafter, at 120, at least one detector detects at least a portion of the beam emitted by the light source. It is later determined, at 130, based on the detected at least a portion of the beam and by a controller that at least one of (i) a power intensity, or (ii) a shape of the beam should be changed. The beam emitted by the light source is then, at 140, selectively changed by a beam modification element under control of the controller. In addition, a concentration of the absorbing media can be quantified or otherwise calculated (using the controller or optionally a different processor that can be local or remote).

FIGS. 2-5 are diagrams 200-500 that show example spectrometers for implementing the current subject matter. While the following is described in connection with detecting absorbing media within gas, it will be appreciated that the current subject matter can also be applied to detecting absorbing media within liquid. A light source 205 provides a continuous or pulsed light that is directed to a detector 210 via a path length 215. The light source 205 can include, for example, one or more of a tunable diode laser, a tunable semiconductor laser, a quantum cascade laser, an intra-band cascade laser (ICL), a vertical cavity surface emitting laser (VCSEL), a horizontal cavity surface emitting laser (HC-SEL), a distributed feedback laser, a light emitting diode (LED), a super-luminescent diode, an amplified spontaneous emission (ASE) source, a gas discharge laser, a liquid laser, a solid state laser, a fiber laser, a color center laser, an incandescent lamp, a discharge lamp, a thermal emitter, and the like. The detector 210 can include, for example, one or more of an indium gallium arsenide (InGaAs) detector, an indium arsenide (InAs) detector, an indium phosphide (InP) detector, a silicon (Si) detector, a silicon germanium (SiGe) detector, a germanium (Ge) detector, a mercury cadmium telluride detector (HgCdTe or MCT), a lead sulfide (PbS) detector, a lead selenide (Pb Se) detector, a thermopile detector, a multi-element array detector, a single element detector, a photo-multiplier, a CMOS (complementary metal oxide semiconductor) detector, a CCD (charge coupled device detector) detector and the like.

Figure 2:
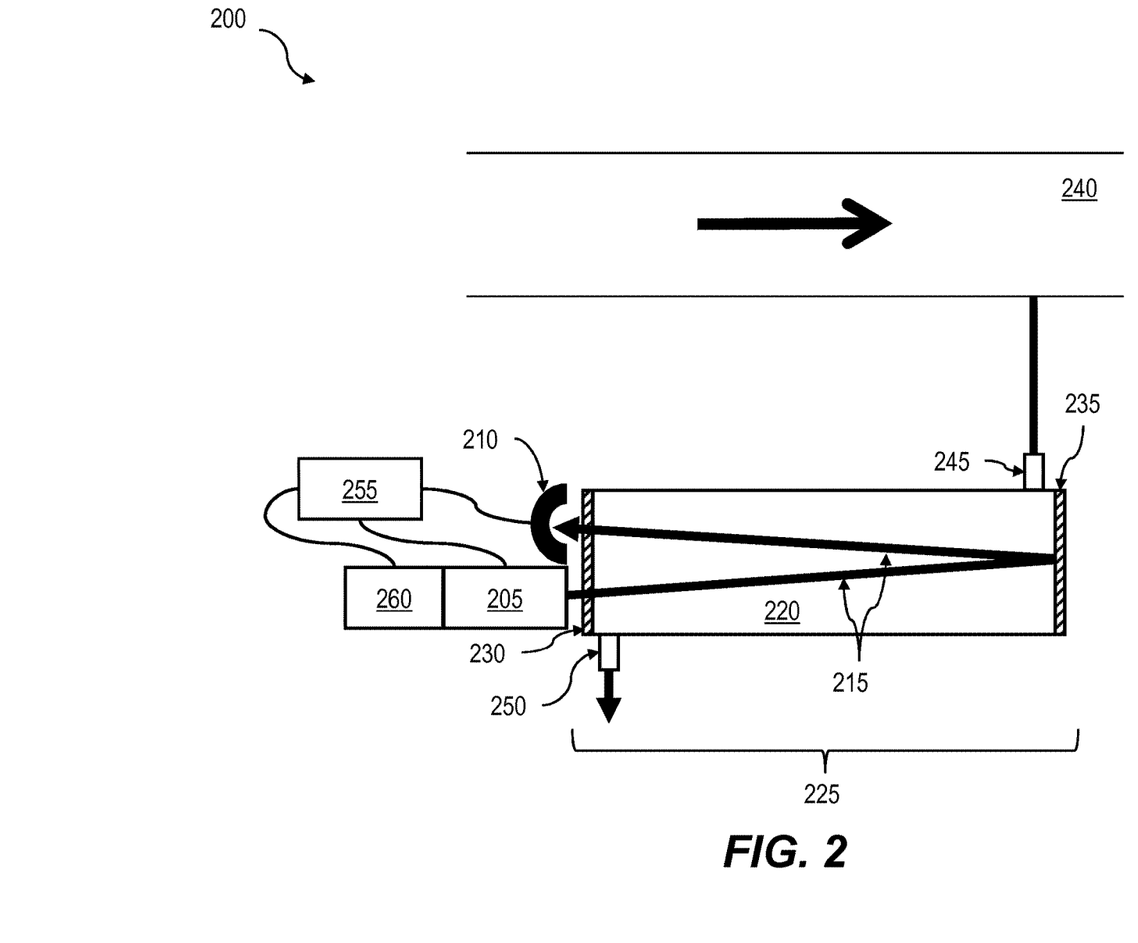
FIG. 2 is a diagram illustrating a first spectrometer with a sample cell.
Figure 3:
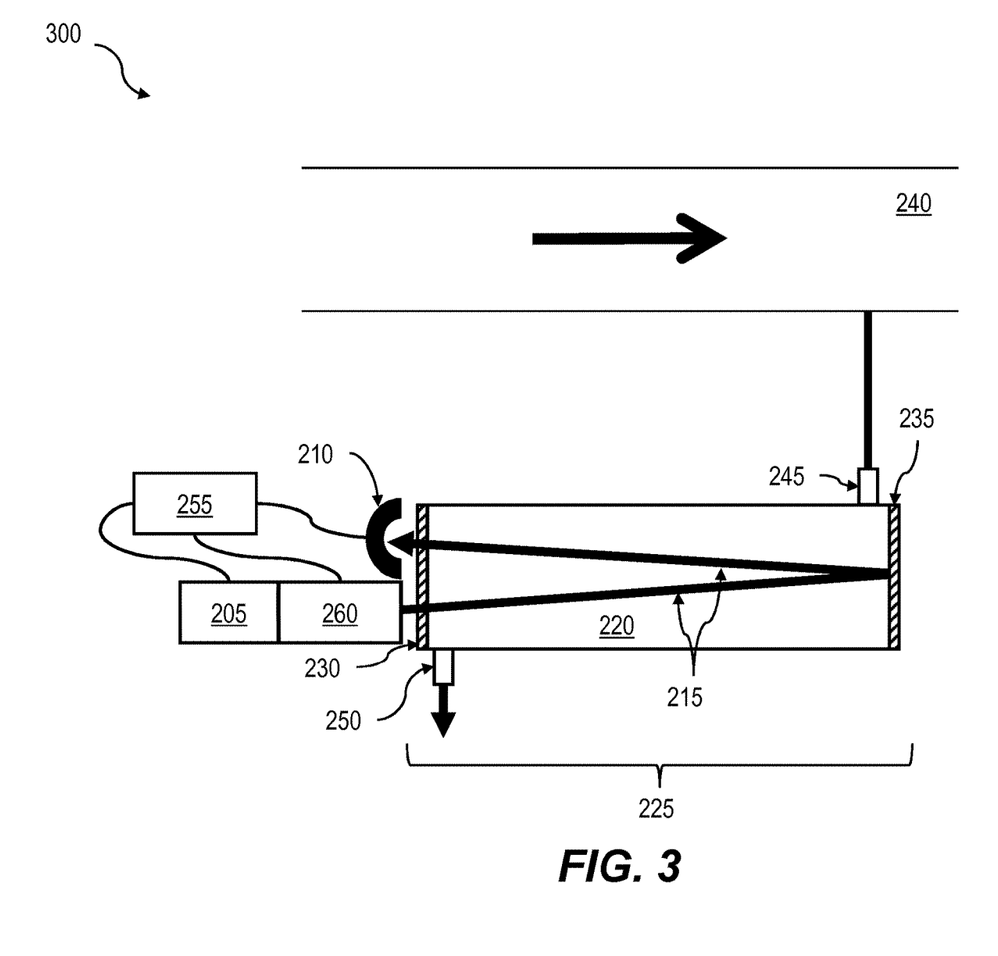
FIG. 3 is a diagram illustrating a second spectrometer with a sample cell.

The path length 215 can traverse one or more volumes. In the example systems 200-500 shown in FIGS. 2-5, the path length 215 can twice traverse a volume 220 of an optical cell 225 that includes a window or other at least partially radiation transmissive surface 230 and a mirror or other at least partially radiation reflective surface 235 that at least partially define the volume 220. Sample gas can, in some implementations, be obtained from a gas source, which in the examples of FIGS. 2 and 3 is a pipeline 240, for delivery to the volume 220, for example via a sample extraction port or valve 245 that receives the sample gas from the source. Gas in the volume 220 can exit via the same valve 245 or a second outlet valve or port 250.

Figure 4:
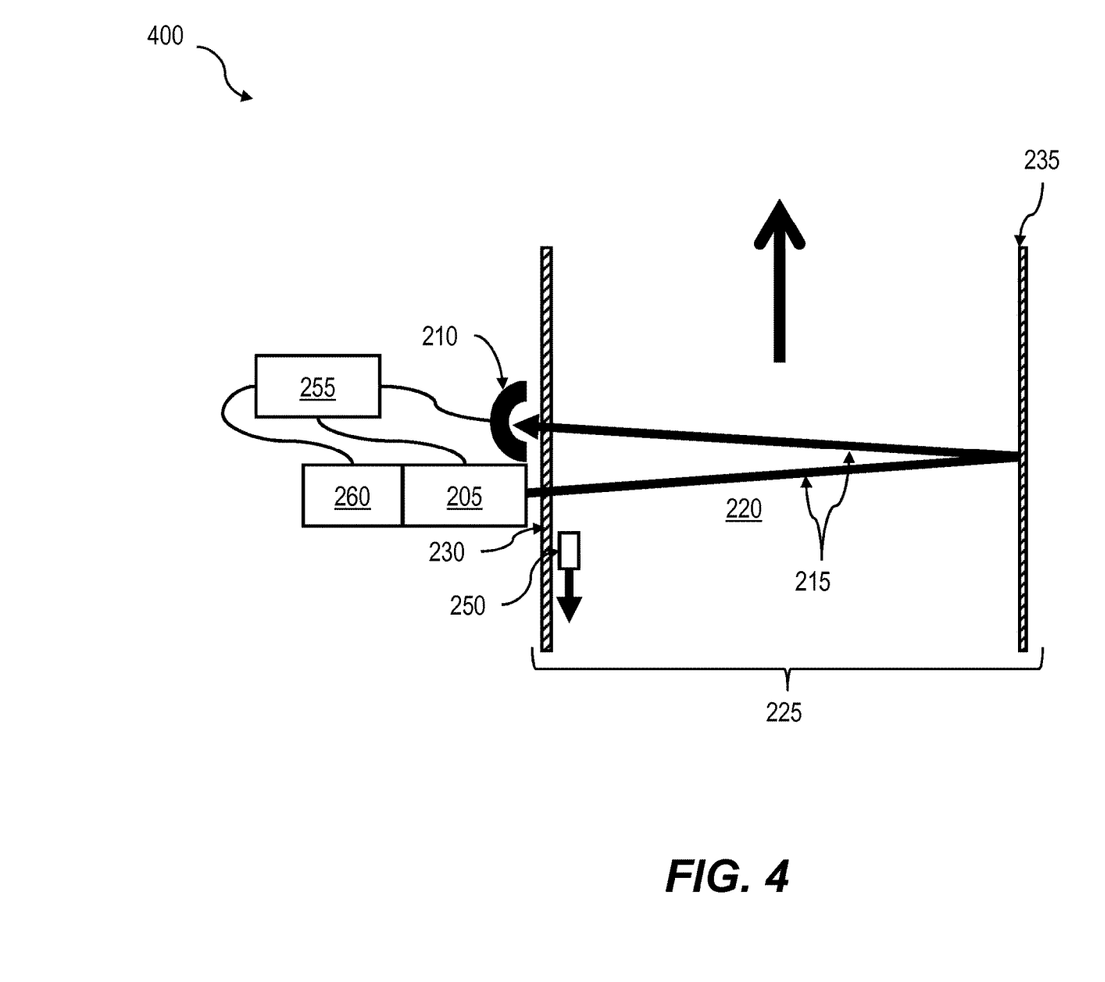
FIG. 4 is a diagram illustrating a first open path spectrometer.

As illustrated in FIGS. 2 and 3, in some variations, the volume 220 can be part of a housing that defines a sample cell that can be, for example, one or more of a Herriott Cell, an off-axis optical resonator, an on-axis optical resonator, an elliptical light collector, a parabolic light collector, a spherical light collector, a White cell, an optical cavity, a hollow core light guide, a multiple pass configuration in which the light beam is reflected at least once or a single pass configuration in which the light is not being reflected while the light traverses the sample cell. In other variations, as illustrated in FIGS. 3 and 4, the volume 220 can be part of an open path system that does not include a dedicated sample cell. Open path systems can be used for various applications including atmospheric pollutant studies, fence line monitoring, process line/tank leak detection, industrial gas-purity applications, and monitoring and control of combustion processes, especially on exhaust stacks.

A controller 255, which can include one or more programmable processors or the like, can communicate with one or more of the light source 205 and the detector 210 for controlling the emission of the light 215 and receiving signals generated by the detector 210 that are representative of the intensity of light impinging on the detector 210 as a function of wavelength. In various implementations, the controller 255 can be a single unit that performs both of controlling the light source 205 and receiving signals from the detector 210, or it can be more than one unit across which these functions are divided. Communications between the controller 255 or controllers and the light source 205 and detector 210 can be over wired communications links, wireless communications links, or any combination thereof. The controller 255 can also, in some cases, be used to quantify an amount of absorbing media using the signal generated by the detector 210. In other variations, the quantification can be performed by at least one external data processor/computing device.

In some cases, the controller 255 can be configured so that the incident DC power on the detector 210 is maintained within the linear response range of the detector and the downstream electronic circuit, which in turn, can assure better concentration calibration fidelity In some implementations, the 2f signal can be normalized by DC in order to eliminate the impact of non-resonance laser intensity attenuation on 2f signal amplitude. The analyte concentration is calculated from the DC normalized 2f signal. It has been found that the opto-electrical gain of the detector $G_D$, the electronic gain of 2f $G_{2f}$, and the electronic gain of DC $G_{DC}$, may not all be constants. For example, $G_D$ can change with the incident laser intensity on the detector $I_D$ due to detector local saturation or nonlinearity. As a result, the $G_D$ can be expanded into Fourier cosine/sine series. Then both the 2f and DC signals (in terms of # of terms and constituents of each term) will be changed, i.e. the DC normalized 2f signal will also change consequently.

As another example, the ratio of $G_{2f}/G_{DC}$ can also change with different $G_{DC}$ due to circuit cross talk/nonlinearity. In such a case, both the 2f and DC signals still contain the same terms, but the DC normalized 2f signal amplitude changes due to the variation of the ratio of $G_{2f}/G_{DC}$.

A beam modification element 260 can be coupled to the light source 205 and the controller 255. The controller 255 can send a signal to the beam modification element 260 to cause it to selectively change a shape and/or power of the beam emitted by the light source 205 as detected by the detector 210. In some variations, the beam modification element 260 can be any controllable device that causes the power and/or shape of the beam to change (and as such the beam modification element 260 is not directly intermediate either of the beam path, on one hand, and the light source 205 and the detector 210, on the other hand). For example, with this variation, the beam modification element 260 can be/include/or be coupled to at least one actuation element such as a least one piezo actuator element, an inch-worm, a mechanical actuator, a magnetic actuator, an electrostatic actuator, an inductive actuator, a rotary actuator, a heated actuator, a pressure actuator, a stress and strain actuator, an analog motor, a stepper motor, an electro-optical actuator, an acousto-optical actuator, a quantum well tuning element, and/or a micro-electro-mechanical systems (MEMS) actuation device which move the beam modification element 260 in at least one of the x-axis, y-axis, or z-axis or rotate it along any axis by some angles.

Figure 5:
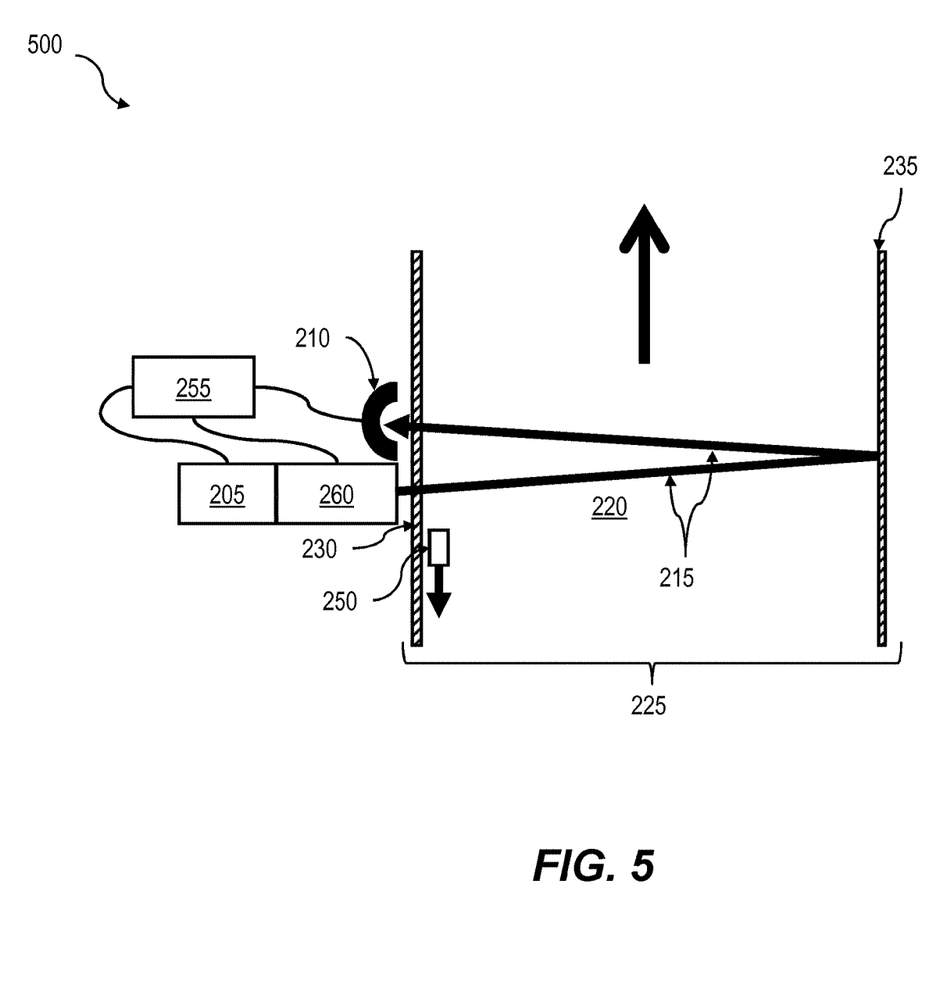
FIG. 5 is a diagram illustrating a second open path spectrometer.

In addition or in the alternative (as shown in FIGS. 3 and 5), the beam modification element 260 can be placed intermediate the light source 205 and the detector 210 and/or to intersect the beam path. With such an arrangement, the beam modification element 260 can be any device/element that optically causes the shape (distribution of power across the beam) and/or power of the beam emitted by the light source 205 to selectively change (in some cases without moving or changing the operation of the light source 205).

The beam modification element 260 can be/include one or more different elements. The beam modification element can include one or more of: an optical transmission filter or an optical diffuser, a transmissive diffuser or a reflective diffuser, a reflector with a selectively adjustable surface, a liquid crystal optical element, a diffractive optical element, a refractive optical element, an adjustable aperture, a waveguide (e.g., an electrically controllable waveguide, etc.), an optical fiber, an optical element with at least one layer of a dielectric material, a tunable filter, a thermal optical tuner, a quantum well tuning element, a neutral density (ND) filter, an optical interference filter, a filter wheel having two or more different optical elements, which change beam power and/or shape, that are selectively movable within the beam path, or a filter wedge with changing optical transmission across its surface.

The beam modification element 260 can comprise saturable absorbers (e.g., photochromic lenses, etc.) in some variations. The beam modification element 260 can comprise spatial filters including, but not limited to, solid and hollow or photonic crystal optical lightguides which can be bent or strained to cause transmitted power loss or which can have an z-axis actuable focusing lens (which can reduce power throughput if moved from its ideal focal spot at the fiber entrance). The beam modification element 260 can include adjustable transmission elements such as liquid crystal optical element, electro-optic element, acousto-optic elements, waveguides with coupled grating structures (electrically, stress and strain driven and heat driven changes can alter the transmission of light of a spectral frequency and bandwidth). The beam modification element 260 can include films made from at least one layer of dielectric material, films made from organic material which can be rotated, and the like. The beam modification element 260 can include volume Bragg gratings (rotatable or heatable), fiber Bragg gratings, light valves, polarizers and/or other types of light power actuators.

The beam modification element 260 can include diffusers and optical elements which modify the beam profile (illuminators or "top hat converters" and the like). Such diffusers and optical elements can distribute laser power across a larger detector area and thus reduce localized high intensity regions where the laser beam impinges upon the surface area, including but not limited to (i) transmissive optical elements with diffractive optical structures which alter the beam profile, (ii) transmissive optical elements (flat surfaces or random curvature) with rough polishing, (iii) reflective optical elements with surface structure which causes scattering of an incident laser beam or alters the beam profile, (iv) diffractive optical elements, (v) Fresnel type optical elements, and/or (vi) films or optical elements made from hydrocarbon materials.

The beam modification element 260 can also be a beam splitting device, free space or fiber coupled to split the original beam and dump the extra optical power.

In some variations, the controller 255 can make a determination that a power and/or shape of the beam should be changed based on an intensity level detected by the detector 210 without reference to spatial location of such beam. For example, the intensity level can indicate that a center of the beam has diverged and/or that there is some interference along the at least a portion of a beam path. In addition or in the alternative, the controller 255 can make a determination that the power and/or shape of the beam should be changed based on a position and/or angle of the beam as detected by the detector 210. With such latter variations, an array of photoreceivers and/or a detector with an array of cells can be used. For example, the detector 210 can be a quad cell detector and/or a position sensing photodiode. With the latter example, the position of the center point of the emitted beam can be determined by a comparison of the detected signals from each cell. Horizontal position of the center point can be calculated by $[(cell_2+cell_4)-(cell_1+cell_3)]/(cell_1+cell_2+cell_3+cell_4)$ and the vertical position of the center point can be calculated by $[(cell_1+cell_2)-(cell_3+cell_4)]/(cell_1+cell_2+cell_3+cell_4)$. In another example, the position sensitive detector can be a detector which detects the x and y position as well as the x and y angles of the beam. Furthermore, a multi-element linear detector array can be used to determine the beam position. In another embodiment, a 2-dimensional detector array can be used to determine the beam position. In another example, the position sensitive detector can be a detector which detects the x and y position as well as the x and y angles of the beam. Furthermore, a multi-element linear detector array can be used to determine the beam position. In another variation, a 2-dimensional detector array can be used to determine the beam position. With such spatially sensitive detectors, a pre-defined position (along two or more dimensions) and/or pre-defined angle (as specified by two or more dimensions) can be maintained via the controller 255 and the beam modification element 260.

The volume 220 can be maintained at a stable temperature and pressure. Alternatively, the volume 220 can include one or more temperature and/or pressure sensors to determine a current temperature and pressure within that volume for use in one or more calculations to compensate for temperature and/or pressure changes relative to a validation or calibration condition of the spectroscopic instrument. Furthermore, the volume 220 can be adjusted to preset temperature and pressure by heating elements and pressure control elements or mass flow controllers.

The controller 255, or alternatively one or more other processors that are either collocated with the other components or in wireless, wired, etc. communication therewith, can perform the processing functions discussed above in reference to the method illustrated in FIG. 1.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A spectrometer comprising:
    at least one light source configured to emit at least one beam into a sample volume of an absorbing medium;
    at least one detector configured to detect at least a portion of the at least one beam emitted by the light source;
    a beam modification element; and
    a controller configured to perform operations comprising:
        determining, based on the detected portion, that an incident power on the at least one detector is outside of a linear response range of the at least one detector;
        causing the beam modification element to selectively change a power intensity and/or a shape of the at least one beam to change the incident power on the at least one detector to within the linear response range.

2. The apparatus of claim 1, wherein the absorbing medium comprises gas.

3. The apparatus of claim 1, wherein the absorbing medium comprises liquid.

4. The apparatus of claim 1 further comprising:
    a housing defining the sample volume, the housing defining a sample cell that comprises at least one of a multiple-pass configuration in which the light is reflected between one or more optically reflective mirrors while the light remains inside the sample cell, a multiple-pass configuration in which the light is refracted by one or more optical elements while the light remains inside the sample cell, a Herriot Cell, an off-axis optical resonator, a parabolic light collector, a spherical light collector, a White cell, an optical cavity, a hollow core light guide, or a single pass configuration in which the light is not being reflected while the light remains inside the sample cell.

5. The apparatus of claim 1, wherein the sample volume forms part of an open path system.

6. The apparatus of claim 1, wherein the beam modification element comprises an optical filter or an optical diffuser.

7. The apparatus of claim 1, wherein the beam modification element comprises an optical lens.

8. The apparatus of claim 1, wherein the beam modification element comprises a transmissive diffusor or a reflective diffusor.

9. The apparatus of claim 1, wherein the beam modification element comprises a reflector with a selectively adjustable surface.

10. The apparatus of claim 1, wherein the beam modification element comprises a liquid crystal optical element.

11. The apparatus of claim 1, wherein the beam modification element comprises an adjustable aperture.

12. The apparatus of claim 1, wherein the beam modification element comprises a tunable filter.

13. The apparatus of claim 12, wherein the tunable filter comprises a thermal optical tuner.

14. The apparatus of claim 12, wherein the tunable filter comprises a quantum well tuning element.

15. The apparatus of claim 1, wherein the beam modification element comprises a filter wheel having two or more different optical filters that are selectively movable within the beam path.

16. The apparatus of claim 1, wherein the beam modification element comprises a filter wedge.

17. The apparatus of claim 1, wherein the beam modification element comprises at least one element selected from a group consisting of: saturable absorbers, optical fibers, spatial filters, waveguides, films made from at least one layer of dielectric material, films made from organic material which can be rotated, Bragg gratings, light valves, polarizers, light power actuators, transmissive optical elements with diffractive optical structures which alter the beam profile, transmissive optical elements with rough polishing, reflective optical elements with surface structure which causes scattering of an incident laser beam or alters the beam profile, diffractive optical elements, Fresnel type optical elements, films or optical elements made from hydrocarbon materials, or beam splitting devices.

18. The apparatus of claim 1 further comprising at least one actuation element that is coupled to at least one of (i) the at least one beam modification element, (ii) the at least one light source, or (iii) the at least one detector, that is and configured to selectively move a position and/or angle of the beam modification element along at least one axis.

19. A method comprising:
    emitting, by at least one light source forming part of a spectrometer, at least one beam into a sample volume containing an absorbing medium;
    detecting, by at least one detector, at least a portion of the beam emitted by the at least one light source;
    determining, based on the detected portion that an incident power on the at least one detector is outside of a linear response range of the at least one detector; and
    selectively changing, by at least one beam modification element a power intensity and/or a shape of the at least one beam to change the incident power on the at least one detector to within the linear response range.

20. A computer-implemented method comprising:
    causing at least one light source forming part of a spectrometer to emit at least one beam into a sample volume comprising an absorbing medium;
    receiving a signal from at least one detector characterizing detection of at least a portion of the beam emitted by the light source;
    determining, based on the received signal, that an incident power on the at least one detector is outside of a linear response range of the at least one detector; and
    causing at least one beam modification element to selectively change a power intensity and/or a shape of the at least one beam to change the incident power on the at least one detector to within the linear response range.

* * * * *